(No Model.)

C. K. HANN.
GRASS CATCHING ATTACHMENT FOR LAWN MOWERS.

No. 529,030. Patented Nov. 13, 1894.

WITNESSES:
H. B. Bradshaw
A. L. Phelps

INVENTOR
Chester K. Hann
BY
Staley and Shepherd
ATTORNEYS.

UNITED STATES PATENT OFFICE.

CHESTER K. HANN, OF COLUMBUS, OHIO, ASSIGNOR TO ALICE M. HANN.

GRASS-CATCHING ATTACHMENT FOR LAWN MOWERS.

SPECIFICATION forming part of Letters Patent No. 529,030, dated November 13, 1894.

Application filed May 9, 1894. Serial No. 510,562. (No model.)

*To all whom it may concern:*

Be it known that I, CHESTER K. HANN, a citizen of the United States, residing at Columbus, in the county of Franklin and State of Ohio, have invented a certain new and useful Improvement in Grass-Catching Attachments for Lawn-Mowers, of which the following is a specification.

My invention relates to the improvement of that class of lawn mower attachments which are known as grass catchers and which are designed to be attached to any ordinary form of lawn mower for the purpose of receiving and holding the grass cut by the mower.

The objects of my invention are to provide a grass catcher of this class of improved construction and arrangement of parts and to provide improved means for adjusting the same for connection with lawn mowers of different widths. These objects I accomplish in the manner illustrated in the accompanying drawings, in which—

Figure 1:
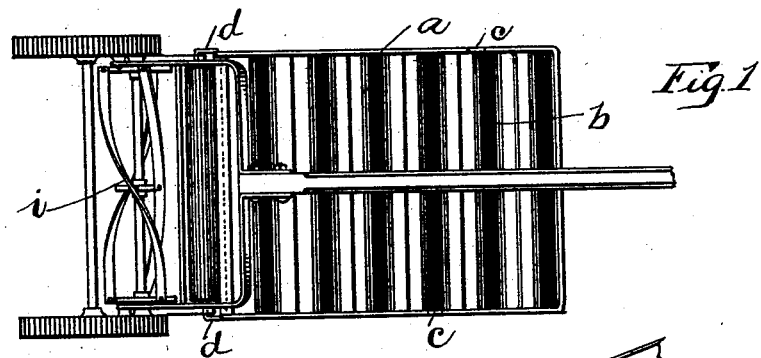
Figure 2:
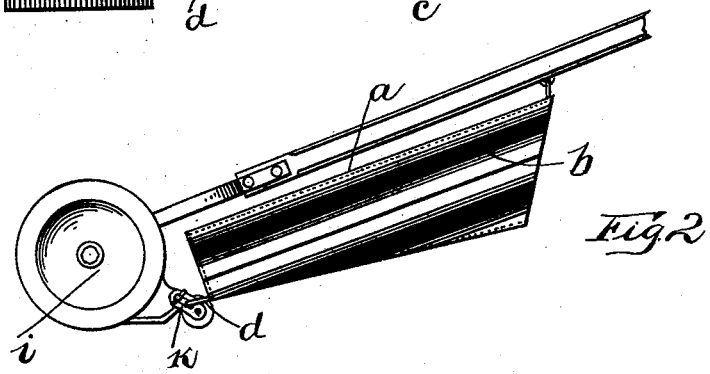
Figures 3, 4:
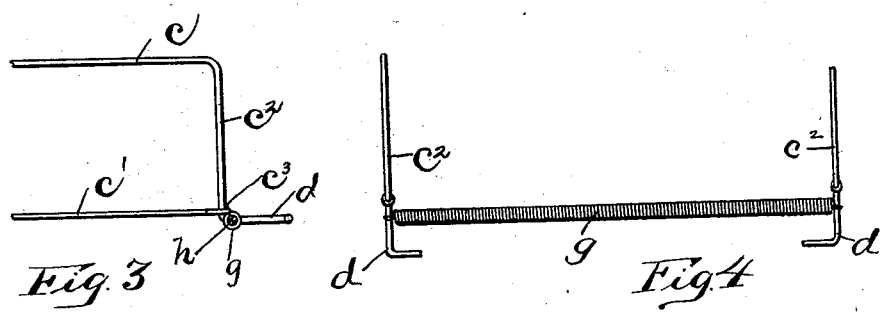
Figure 5:
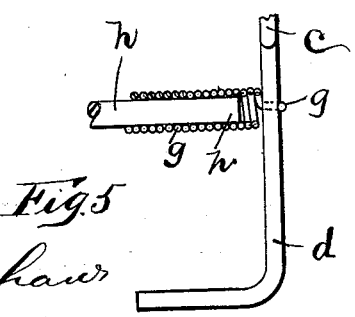

Figure 1 is a plan view of my improved grass catcher shown attached to a lawn mower. Fig. 2 is a side elevation of the same. Fig. 3 is a transverse section on line $x\,x$ of Fig. 4. Fig. 4 is a plan view of the forward end of the catcher frame and Fig. 5 is a detail plan view of one of the attaching hoops showing in connection therewith a portion of the adjusting spring, the latter being in section.

Similar letters refer to similar parts throughout the several views.

$a$ represents the grass catcher which as is usual in this class of devices, consists of an oblong or suitably shaped frame of metallic rods or wire, the rear end, sides and bottom of said frame being covered by any suitable material $b$.

Of the wire grass catcher frame $c$ and $c'$ represent respectively the upper and lower side wires, said upper wires $c$ being at their forward ends bent downward as indicated at $c^2$, and the forward ends of the lower side wires $c'$ being connected, as shown at $c^3$ with the lower portions of said arms $c^2$. The lower portion of each of the arms $c^2$ is, as shown, provided with a forward extension the end of which is turned inwardly to form a substantially hook shaped arm $d$.

As indicated, the arms $c^2$ are connected preferably adjacent to the points $c^3$ by a transverse coil spring $g$, the latter being made to inclose, as shown more clearly in Fig. 5 of the drawings, a rod $h$ the length of which is not greater than the length of said spring when the latter is not under tension, said rod serving to impart to said spring the desired rigidity. This coil spring which serves as the only connection between the forward portions of the catcher frame sides, is also preferably covered with the forward edge of the material $b$, the latter being arranged to form a shirred casing therefor.

As indicated in the drawings, the manner of attaching my improved grass catcher to a lawn mower $i$, consists in bringing the forward end of said catcher frame in such position as to admit of the side wires of the frame being at their forward portions sprung outward sufficiently so as to cause an engagement of the hooks $d$ with the usual roller adjusting link $k$ of the mower when the frame sides are relieved of outward pressure. Although shown and described as connecting with a particular portion of the lawn mower frame, it is evident that the hooks $d$ may be made to engage with any convenient opening or part of a lawn mower.

From the construction which I have described, it will readily be seen that the spring connection between the forward portions of the catcher frame is such as to normally draw the forward portion of said frame sides inward and that a spring of this character can be so formed as to admit of the catcher being attached and held in connection with lawn mowers of any ordinary width. It will be observed that by the means of attachment herein set forth, the connection is not only readily made, but that the necessity of employing bolts or nuts or other means as attachment, is entirely obviated.

It will be observed that the closely coiled spring which is extended between the sides of the frame will serve to present a smooth round surface for the attachment of the fabric of the receptacle.

Having now fully described my invention, what I claim, and desire to secure by Letters Patent, is—

In a grass catching attachment for lawn mowers the combination with the main frame and means for engaging the forward end of said frame with a lawn mower, of a coiled spring extending the entire distance between the sides of said frame and a stiffening rod within said coiled spring, substantially as and for the purpose specified.

CHESTER K. HANN.

In presence of—
C. C. SHEPHERD,
H. B. BRADSHAW.